US006383459B1

(12) United States Patent
Singh et al.

(10) Patent No.: US 6,383,459 B1
(45) Date of Patent: May 7, 2002

(54) METHOD FOR PURIFYING A TANTALUM COMPOUND USING A FLUORIDE COMPOUND AND SULFURIC ACID

(75) Inventors: Raj P. Singh, Sayre; Michael J. Miller, Towanda, both of PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/652,517

(22) Filed: Aug. 31, 2000

(51) Int. Cl.$^7$ .................. C01G 35/00; C01B 9/08; C01C 1/00
(52) U.S. Cl. .................. 423/68; 423/65; 423/464; 423/593
(58) Field of Search .................. 423/62, 65, 68, 423/464, 593

(56) References Cited

U.S. PATENT DOCUMENTS

| 1,802,242 A | * | 4/1931 | Fink et al. .................. 423/68 |
| 2,888,320 A | * | 5/1959 | McCord .................. 423/593 |
| 3,117,833 A | | 1/1964 | Pierret .................. 23/19 |
| 3,653,850 A | * | 4/1972 | Eberts .................. 423/464 |
| 3,712,939 A | | 1/1973 | Capps et al. .................. 423/63 |
| 4,446,115 A | | 5/1984 | Endo et al. .................. 423/63 |
| 4,673,554 A | | 6/1987 | Niwa et al. .................. 423/63 |
| 5,635,146 A | | 6/1997 | Singh et al. .................. 423/65 |
| 6,010,676 A | | 1/2000 | Singh et al. .................. 423/464 |

FOREIGN PATENT DOCUMENTS

| SU | 1149572 | * 11/1986 | .................. 423/464 |

* cited by examiner

Primary Examiner—Steven Bos
(74) Attorney, Agent, or Firm—Robert F. Clark

(57) ABSTRACT

A direct dissolution method for the purification of technical grade hydrated ammonium tantalum oxide (HATO), $(NH_4)_{2-x}H_xTa_2O_6 \cdot nH_2O$), and related compounds such as tantalum hydroxide and tantalum oxide is described. The method preferably uses ammonium bifluoride as fluoride source in place of the hydrofluoric acid used in the conventional methods. Other fluoride compounds such as NaF, KF, and $CaF_2$ may be used.

8 Claims, No Drawings

METHOD FOR PURIFYING A TANTALUM COMPOUND USING A FLUORIDE COMPOUND AND SULFURIC ACID

TECHNICAL FIELD

This invention relates to methods for the processing and purification of tantalum containing ores and compounds. In particular, it relates to methods of producing a high purity tantalum compound from standard grade tantalum oxides, hydroxides and hydrated ammonium tantalates.

BACKGROUND ART

High purity tantalum metal and tantalum pentoxide have become increasingly important to the electronics industry in the preparation of advanced electronic materials used in the manufacture of devices such as surface acoustic wave filters, pyroelectric infrared sensors, optoelectronic devices and capacitors. Prior to 1957, niobium and transition metals were separated from tantalum by a fractional crystallization process known as the Marignac process which exploits the difference in solubility between $K_2TaF_7$ and $K_2NbOF_5 \cdot H_2O$ and other fluorometallates. However, tantalum pentoxide obtained by this process contains large impurities of Nb (1000–3000 ppm), and other elements such as Si (up to 3000 ppm), Ti (up to 100 ppm), and Fe (up to 2000 ppm). These levels are much greater than for example the total allowable transition metal impurity level (less than 1000 ppm) in the tantalum wire used in the manufacture of capacitors. In late 1950's, modern solvent extraction and ion exchange processes supplanted the use of the Marignac process. Examples of liquid-liquid solvent extraction and ion exchange methods are disclosed in U.S. Pat. Nos. 3,117,833, 3,712,939, 4,673,554 and 4,446,115. In a solvent extraction process, ore concentrates containing at least 25 wt. % tantalum and niobium pentoxide are decomposed chemically in hydrofluoric acid media and the dissolved tantalum and niobium species are separated from the residue by filtration. The filtrate containing tantalum (as $TaF_7^{2-}$) and niobium (as $NbOF_5^{2-}$) in an $HF/H_2SO_4$ medium is brought into contact with an organic phase, usually methyl iso-butyl ketone (MIBK), which selectively absorbs tantalum and niobium species leaving impurities such as titanium, iron, and silicon in the aqueous phase. Niobium is separated from tantalum by back extraction with sulfuric acid. Finally, tantalum ($TaF_7^{2-}$) is eluted from organic phase (MIBK) by an ammonium fluoride solution and converted into $K_2TaF_7$ by precipitation with KCl. Although $Ta_2O_5$ (or $K_2TaF_7$) made by solvent extraction method can be used for most applications, this procedure is costly, uses large quantities of HF which requires special handling, and requires the disposal of large quantities of solvents.

U.S. Pat. No. 5,635,146, which is incorporated herein by reference, describes an alternative method for the preparation of pure $K_2TaF_7$ and tantalum pentoxide. This method also requires the use of hydrofluoric acid albeit in lesser amounts than the above described methods.

U.S. Pat. No, 6,010,676 describes a direct dissolution method where an impure tantalum compound is slurried with sulfuric acid prior to dissolution in hydrofluoric acid.

SUMMARY OF THE INVENTION

It is an object of this invention to obviate the disadvantages of the prior art.

It is another object of the invention to provide an economical method for purifying tantalum without the use of hydrofluoric acid.

It is a further object of the invention to provide a method to produce high purity $K_2TaF_7$ without utilizing solvent extraction or ion exchange techniques.

In accordance with the objects of this invention, there is provided a method of purifying a tantalum compound, comprising:
(a) combining a tantalum compound containing impurities with a fluoride containing compound and sulfuric acid to form a solution containing tantalum values and impurities; the tantalum compound being selected from a tantalum oxide, a tantalum hydroxide or an hydrated ammonium tantalum oxide, or a combination thereof; the fluoride containing compound being selected from ammonium bifluoride, NaF, KF, $CaF_2$, or a combination thereof; and
(b) separating the tantalum values from the impurities to obtain a purified tantalum compound.

DESCRIPTION OF THE PREFERRED EMBODIMENTS

We discovered that technical grade hydrated ammonium tantalum oxide (HATO), $(NH_4)_{2-x}H_xTa_2O_6 \cdot nH_2O$), and related compounds such as tantalum hydroxide and tantalum oxide, which contain relatively high impurity levels, can be used to produce a highly pure tantalum compound such as $K_2TaF_7$ by a direct dissolution process. The method of this invention preferably uses ammonium bifluoride, $NH_4HF_2$, as the fluoride source in place of the hydrofluoric acid used in the conventional methods. This is particularly advantageous because ammonium bifluoride is about 70% less expensive (in terms of F values) and much safer and easier to handle and store than HF.

Generally, the method comprises dissolving HATO, tantalum hydroxide and/or tantalum oxide and a fluoride containing compound in sulfuric acid. The preferred fluoride containing compound is ammonium bifluoride. Other fluoride containing compounds include NaF, KF and $CaF_2$, or a combination thereof which may be used separately or in combination with ammonium bifluoride. Some tantalum compounds such as tantalum pentoxide may require conversion to potassium tantalate prior to dissolution as described in U.S. Pat. No. 5,635,146. Once in solution, tantalum values are precipitated preferably as pure $K_2TaF_7$ by the addition of KCl or another water-soluble potassium compound such as $K_2CO_3$, KOH, KF, $K_2C_2O_4$, or $K_2O$. Crystals of the highly pure $K_2TaF_7$ product are separated by filtration, washed and dried at 110 ° C.

The following non-limiting examples are presented.

EXAMPLE 1

A 62.5 g amount of an impure amorphous hydrated ammonium tantalum oxide (HATO) was mixed with 106 g of $NH_4HF_2$ and 125 ml of concentrated sulfuric ($H_2SO_4$) acid (18 M) was slowly added to dissolve tantalum values. A slightly exothermic reaction was observed. The concentrated solution was diluted with 2 liters of de-ionized (DI) water and 75 g of KCl was added to precipitate $K_2TaF_7$. The supernatant was decanted leaving about a ½ liter slurry. A 0.5 liter volume of DI water was added to the slurry and solid was separated by filtration. The cake on the filter paper was washed with 0.5 liters of DI water. The washed precipitate of $K_2TaF_7$ was dried at 110° C. and analyzed. The impurity levels in the $K_2TaF_7$ are compared in Table 1 to the levels in the HATO starting material. These results show that the method has produced a highly pure $K_2TaF_7$. In particular, the concentration of the niobium and Fe were greatly reduced. The highly pure $K_2TaF_7$ can be converted to tantalum oxide according to U.S. Pat. No. 6,010,676 or to high purity tantalum metal powder using known methods.

TABLE 1

Concentrations with respect to $Ta_2O_5$, ppm

| Element | HATO Starting Material | $K_2TaF_7$ (Example 1) |
|---|---|---|
| Na | 420 | 38 |
| Al | 360 | 51 |
| Si | 320 | 72 |
| P | 8 | 0.7 |
| Ca | 94 | 3.5 |
| Ti | 120 | 0.9 |
| V | 0.4 | <0.1 |
| Cr | 14 | 0.3 |
| Mn | 1.9 | <0.1 |
| Fe | 55 | 0.5 |
| Co | 10 | <0.1 |
| Ni | 1.2 | <0.1 |
| Cu | <0.5 | <1 |
| Zn | 0.9 | 0.4 |
| Zr | 4.1 | <0.2 |
| Nb | 310 | 10 |
| W | 44 | 22 |
| Pb | 2.8 | 0.2 |

EXAMPLE 2

A 1600 g amount of $Ta_2O_5$ was mixed with 600 g of reagent grade $K_2CO_3$. The mixture was passed through a 20-mesh sieve and heated at 750° C. for 10 hours in a 2 liter silica crucible. After cooling to room temperature, the contents of the crucible were suspended in 8 to 10 liters of water, mixed well and allowed to settle. The supernatant was removed by decantation. The solids were then washed with water to a neutral pH and dried at 110° C. to obtain $KTaO_3$.

A 275 g amount of technical grade NaF was placed in a 4 liter plastic beaker. The beaker was placed in cold water bath and 310 ml of reagent grade $H_2SO_4$ was added while continuously mixing using a plastic rod. CAUTION IS REQUIRED WHILE ADDING THE SULFURIC ACID BECAUSE OF THE HIGHLY EXOTHERMIC REACTION. After the reaction is completed, a 125 g amount of the $KTaO_3$ was added slowly while stirring continuously. AGAIN CAUTION IS REQUIRED BECAUSE OF THE HIGHLY EXOTHERMIC REACTION PRODUCED. To this, 4.5 liters of water was added and mixed well. Tantalum values were precipitated as $(Na,K)_2TaF_7$ by adding 100 g of KCl and leaving the precipitate in the mother liquor overnight for crystallization. The supernatant was removed and the precipitate filtered and washed with 1.5 liters of water. The precipitate was dried overnight at 110° C. and the impurity levels were determined by Glow Discharge Mass Spectrometry (GDMS).

The GDMS data presented in Table 2 shows that the impurities present in starting technical grade $Ta_2O_5$ are efficiently removed during the precipitation of fluorotantalate compound. The product, $(Na,K)_2TaF_7$, is crystalline but could not be matched with known fluorotantalate phases. The specific surface area of the product at 0.7 m2/g was similar to $K_2TaF_7$ prepared according to U.S. Pat. No. 5,635,146. The morphology and surface area of the compound suggest that it could be directly converted into ammonium tantalate via hydrolysis in ammonium hydroxide according to the method presented in U.S. Pat. No. 6,010,676.

TABLE 2

| Elements | $Ta_2O_5$ | $(Na, K)_2TaF_7$ |
|---|---|---|
| Chromium | 5 | 0.3 |
| Cobalt | 3.4 | 0.5 |
| Copper | 1.2 | <1 |
| Iron | 18 | 4.5 |
| Lead | 0.6 | 0.4 |
| Manganese | 0.6 | <0.1 |
| Nickel | 2.9 | 0.9 |
| Niobium | 83 | 1.7 |
| Tin | <0.3 | <0.5 |
| Titanium | 2.8 | 3.5 |
| Tungsten | 15 | 2.6 |
| Zinc | <0.3 | <0.5 |

While there has been shown and described what are at the present considered the preferred embodiments of the invention, it will be obvious to those skilled in the art that various changes and modifications may be made therein without departing from the scope of the invention as defined by the appended claims.

We claim:
1. A method of purifying a tantalum compound, comprising:
   (a) combining a tantalum compound containing impurities with a fluoride containing compound and sulfuric acid to form a solution containing tantalum values and impurities; the tantalum compound being selected from a tantalum oxide, a tantalum hydroxide or an hydrated ammonium tantalum oxide, or a combination thereof; the fluoride containing compound being selected from ammonium bifluoride, NaF, KF, $CaF_2$, or a combination thereof; and
   (b) separating the tantalum values from the impurities to obtain a purified tantalum compound.
2. The method of claim 1 wherein the tantalum values are separated by adding a soluble potassium compound to the solution.
3. The method of claim 2 wherein the purified tantalum compound is potassium fluorotantalate.
4. The method of claim 2 wherein the fluoride containing compound is NaF and the purified tantalum compound is $(Na,K)_2TaF_7$.
5. The method of claim 1 wherein the tantalum compound containing impurities is converted to potassium tantalate prior to combining with the fluoride containing compound and sulfuric acid.
6. A method of purifying a tantalum compound, comprising:
   (a) combining an impure hydrated ammonium tantalum oxide with ammonium bifluoride and sulfuric acid to form a solution containing tantalum values and impurities;
   (b) separating the tantalum values from the impurities by adding a soluble potassium compound to precipitate potassium fluorotantalate; and
   (c) filtering to remove the precipitate.
7. The method of claim 6 wherein the soluble potassium compound is KCl.
8. A method of purifying a tantalum compound, comprising:
   (a) converting a tantalum oxide containing impurities to potassium tantalate;
   (b) combining the potassium tantalate with NaF and sulfuric acid to form a solution containing tantalum values and impurities;

(c) separating the tantalum values from the impurities by adding a soluble potassium compound to precipitate $(Na,K)_2TaF_7$; and (d) filtering to remove the precipitate.

* * * * *